(No Model.)
C. A. HUSSEY.
BATTERY CARBON.
No. 414,317. Patented Nov. 5, 1889.
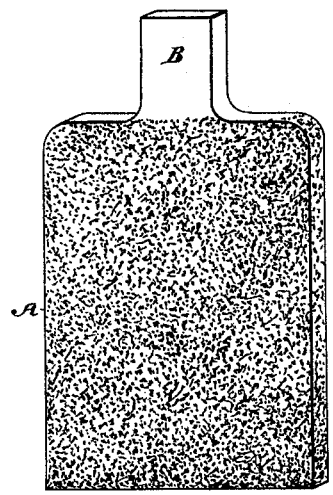
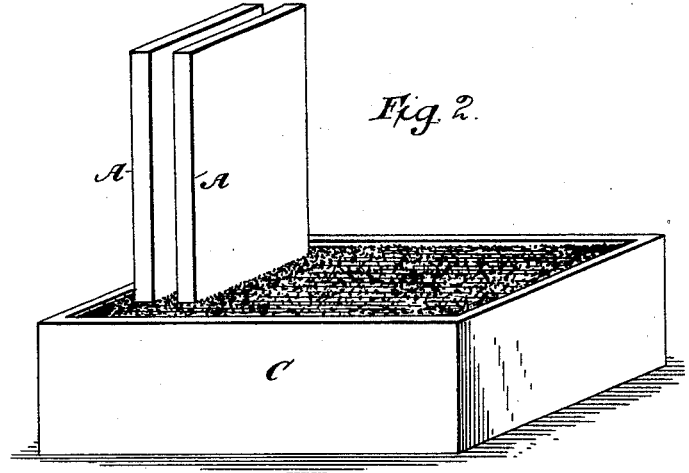
Witnesses
C. R. Ferguson
W. H. Robinson
Inventor
Charles A. Hussey
By his attorneys
Gifford & Brown

UNITED STATES PATENT OFFICE.

CHARLES A. HUSSEY, OF NEW YORK, N. Y.

BATTERY-CARBON.

SPECIFICATION forming part of Letters Patent No. 414,317, dated November 5, 1889.

Application filed February 9, 1889. Serial No. 299,281. (No model.)

*To all whom it may concern:*

Be it known that I, CHARLES A. HUSSEY, of New York, in the county and State of New York, have invented a certain new and useful Improvement in Battery-Carbons, of which the following is a specification.

I will describe my improved carbon and the process for making the same in detail, and then point out the novel features in the claim.

In the accompanying drawings, Figure 1 is a perspective view of a battery-carbon embodying my improvement. Fig. 2 is a view of certain apparatus which may be used in manufacturing the same.

Similar letters of reference designate corresponding parts in both figures.

In carrying out my improvement I take ordinary battery-carbon, by preference such as is usually prepared for use in electric batteries. I have illustrated a convenient shape for the carbon in Fig. 1, in which A designates the body of the carbon, and B a shank or projection extending from one end thereof. I subject the carbon to heat in a stove, furnace, oven, or other suitable heater, so as to "burn." The heat I have found advantageous to employ is such as to bring the carbon to a "red heat." In this condition I allow it to remain for a time—say, for about fifteen minutes—and then remove it from the heater and allow it to cool. Carbon thus treated will be found to be highly porous and to have a granulated exterior. The numerous small protuberances upon the exterior of the carbon materially lessen the tendency of the carbon to polarize when in use, while the greatly increased porosity of the carbon contributes to the production of a more powerful quantity of current than is possible with ordinary carbons, owing to the large carbon surface acted upon by the exciting-fluid.

In Fig. 2 I have shown convenient means for arranging a number of carbons preparatory to being "burned." C designates a box which may be made of any suitable material not liable to destruction by heat. In this box I place sand to a level nearly even with the top. I take the carbons and force the shanks B thereof into the sand until the shanks are covered. The carbons are arranged side by side. The sand serves to maintain the carbons upright, and to protect the shanks thereof from the action of the heat. This latter is advantageous because the shanks by which the carbons are to be supported are left compact and firm, thus affording a better support.

What I claim as my invention, and desire to secure by Letters Patent, is—

As a new article of manufacture, a battery-carbon having the main portion burned to produce a granulated surface and render it porous, and having a shank or upper portion unburned, substantially as specified.

CHARLES A. HUSSEY.

Witnesses:
C. R. FERGUSON,
WM. H. ROBINSON.